United States Patent
Lowery

[11] 3,876,245
[45] Apr. 8, 1975

[54] AUTOMOBILE SUN AND RAIN BONNET

[76] Inventor: James I. Lowery, 208 Judy St., Houston, Miss. 38851

[22] Filed: Sept. 24, 1973

[21] Appl. No.: 399,719

[52] U.S. Cl. .................. 296/95; 98/2.15; 135/5 A; 165/44; 165/47; 165/128
[51] Int. Cl. ............................................... B60j 1/20
[58] Field of Search ............... 296/136, 95 R, 23 R; 135/1 A, 5 A; 165/44, 47, 128; 98/2.14, 2.15; 62/241

[56] References Cited
UNITED STATES PATENTS

| | | | |
|---|---|---|---|
| 1,584,553 | 5/1926 | Killip | 296/95 R |
| 1,935,456 | 11/1933 | McCarthy | 98/2.15 |
| 2,087,651 | 7/1937 | Mygland | 98/2.15 |
| 2,570,399 | 10/1951 | Smith | 296/95 R |
| 2,608,942 | 9/1952 | Smith | 296/95 R |
| 3,476,032 | 11/1969 | Mattly | 98/2.15 |
| 3,791,443 | 2/1974 | Burt | 165/45 |

FOREIGN PATENTS OR APPLICATIONS

| | | | |
|---|---|---|---|
| 798,110 | 5/1936 | France | 135/5 A |
| 6,715,664 | 5/1968 | Netherlands | 296/136 |

Primary Examiner—Albert J. Makay
Assistant Examiner—Gary Auton
Attorney, Agent, or Firm—Clarence A. O'Brien; Harvey B. Jacobson

[57] ABSTRACT

A horizontal panel structure is provided for disposition over and support from the roof portion of a vehicle, such as a passenger automobile. The panel structure serves not only as a sun shield but also as a rain shield and includes front, rear and opposite side marginal portions for disposition along the corresponding marginal portions of the associated vehicle roof portion. Each of the panel structure marginal portions defines an outwardly opening slot extending therealong and an extension panel member is shiftably disposed in each slot and extendible and retractable therein relative to the corresponding marginal portion of the panel structure. The opposite ends of one pair of opposite extension panel members include extension sections supported therefrom for extension and retraction relative to the opposite ends of the extension panel members and the panel structure consists of at least three layers or plies with the top ply being constructed of heat insulative material, the central ply comprising a plurality of side by side open ended tubular members and the lower ply comprising a thin sheet of material having poor heat transmitting properties. The tubes of the center ply extend longitudinally of the panel structure and the forward marginal edge of the upper ply includes an elongated radiant heat absorbing member extending therealong closely above the forward ends of the tubes, whereby the radiant heat absorbing member may, by convection currents, generate a forward flow of cooling air through each of the tubes when the associated vehicle is at least substantially at a standstill.

3 Claims, 6 Drawing Figures

AUTOMOBILE SUN AND RAIN BONNET

The sun and rain shield or bonnet of the instant invention has been designed primarily for use on top of the roof of a passenger motor vehicle such as an automobile. However, the shield may also be used on the tops of boat cabins, mobile homes, trailer homes and small stationary structures such as construction offices, and the like.

The shield is to be of a size and plan shape corresponding to the size and plan shape of the roof over which it is disposed and the various marginal edge portions of the shield include extension panel members which may be extended and retracted edgewise outwardly of the corresponding marginal portions of the shield. Still further, structure is provided for developing a flow of cooling air through a central ply area of the shield and the latter may be secured over any suitable roof in any convenient manner, such as by suction cups, or the like.

The main object of this invention is to provide a sun, heat and rain shield for use in covering the roof of a structure and shielding the roof from radiant heat sources, such as the sun.

Another object of this invention is to provide a roof cover or shield, including edgewise outwardly extendible panel sections defining awnings protecting the adjacent side surfaces of the structure on which the shield is disposed from the rays of the sun and from rain.

Still another object of this invention is to provide a shield in accordance with the preceding objects and which will be of lightweight construction.

A final object of this invention to be specifically enumerated herein is to provide a shield in accordance with the preceding objects which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
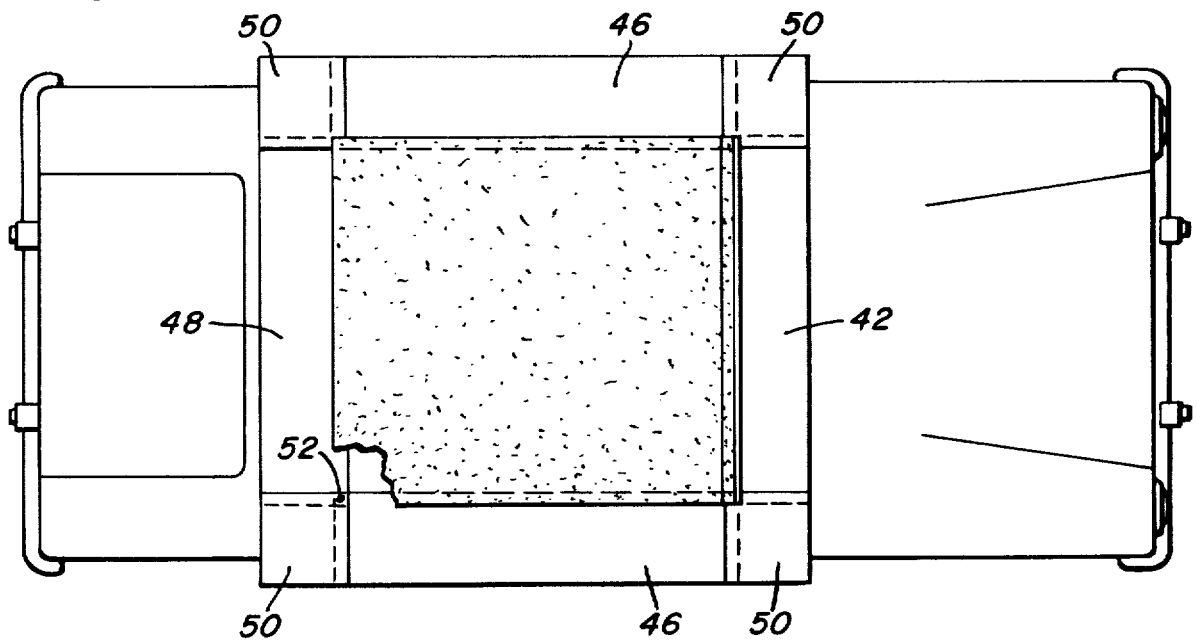
FIG. 1 is a top plan view of a conventional form of automobile with the shield of the instant invention mounted on the top of the automobile and the extension panel members of the shield in extended positions.
Figure 2:
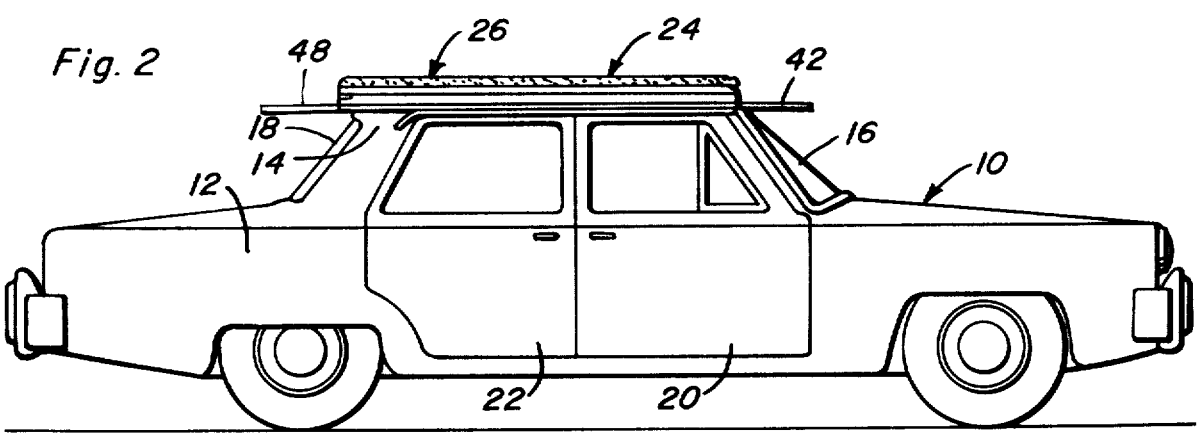
FIG. 2 is a side elevational view of the assemblage illustrated in FIG. 1.

Referring now more specifically to the drawings, the numeral 10 generally designates a conventional form of passenger vehicle including a lower body 12 and a roof structure 14. The forward portion of the roof structure 14 terminates in a forwardly and downwardly inclined windshield 16 and the rear marginal portion of the roof structure 14 terminates in a rearwardly and downwardly inclined rear window assembly. Also, the opposite side marginal edge portions of the roof structure 14 terminate in downwardly extending vehicle side portions including the upper portions of front and rear doors 20 and 22 on opposite sides of the vehicle 10.

The shield structure of the instant invention is referred to in general by the reference numeral 24 and includes a horizontal panel structure 26 including an upper ply section 28, a lower ply section 30 and a central ply section 32. The upper ply section 28 comprises a panel of heat insulative material, such as foam plastic, and the lower panel section 30 comprises a relatively thin panel of plastic material sealed about its peripheral edges to the roof structure 14 by means of marginal seal strips 34. The central or intermediate panel structure 32 comprises a plurality of longitudinally extending side by side plastic tube members 36 open at their opposite ends. Further, a fourth ply 38 is provided between the upper ply section 28 and the intermediate ply section 32. The fourth ply 38 comprises a thin sheet of heat reflective material, such as aluminum sheeting or foil.

Figure 5:
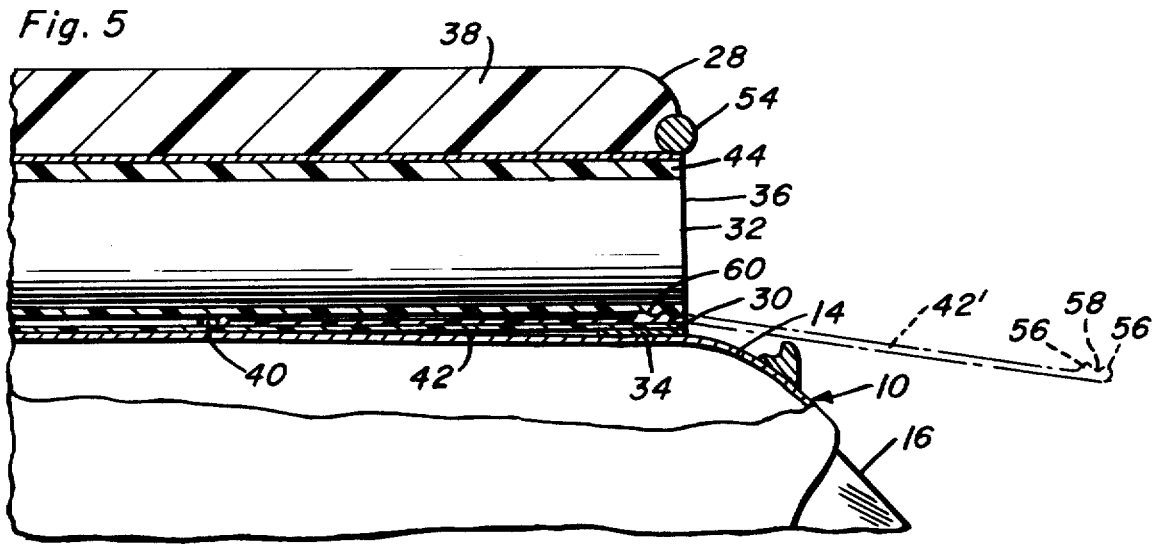
FIG. 5 is an enlarged fragmentary longitudinal vertical sectional view taken substantially upon the plane indicated by the section line 5—5 of FIG. 3.
Figure 6:
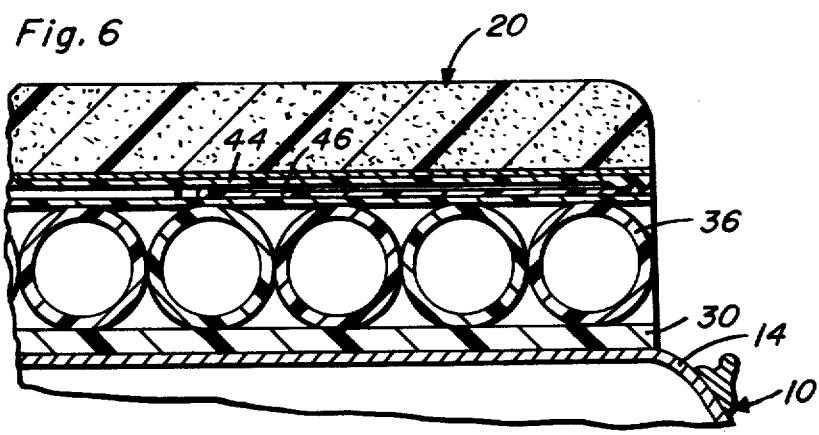
FIG. 6 is an enlarged fragmentary transverse vertical sectional view taken substantially upon the plane indicated by the section line 6—6 of FIG. 3.

As can best be seen from FIG. 5 of the drawings, the forward marginal edge portion of the plastic sheet 30 has an edgewise outwardly opening slot 40 formed therein and an extension panel member 42 is disposed within the slot 40 and supported for sliding movement edgewise outwardly of the forward marginal edge portion of the plastic panel 30 toward an extended position thereof, such as that designated by the reference numeral 42'. In addition, with attention now invited more specifically to FIG. 6 of the drawings, the opposite side marginal portions of the panel structure 26 include slot defining plastic panels 44 which open edgewise outwardly of the side marginal edge portions of the panel structure and have extension panel members 46 corresponding to the extension panel members 42 slidably disposed therein for extension and retraction relative to the side marginal edge portions of the panel structure. Still further, the rear marginal edge portion of the panel structure 26 includes a plastic sheet or panel disposed below the tube members 36 and which defines similar edgewise outwardly opening slots in which extension panel members 48 are slidable between retracted and extended positions.

Figure 3:
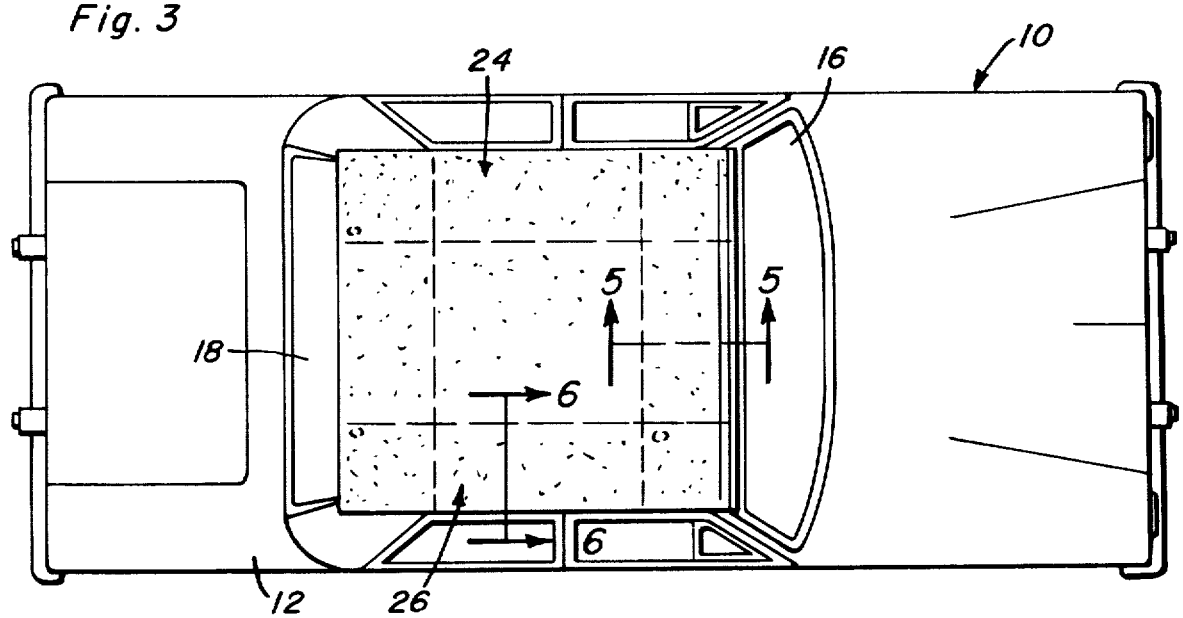
FIG. 3 is a top plan view of the vehicle with the shield mounted on the roof of the vehicle and the extension panel members in fully retracted positions.
Figure 4:
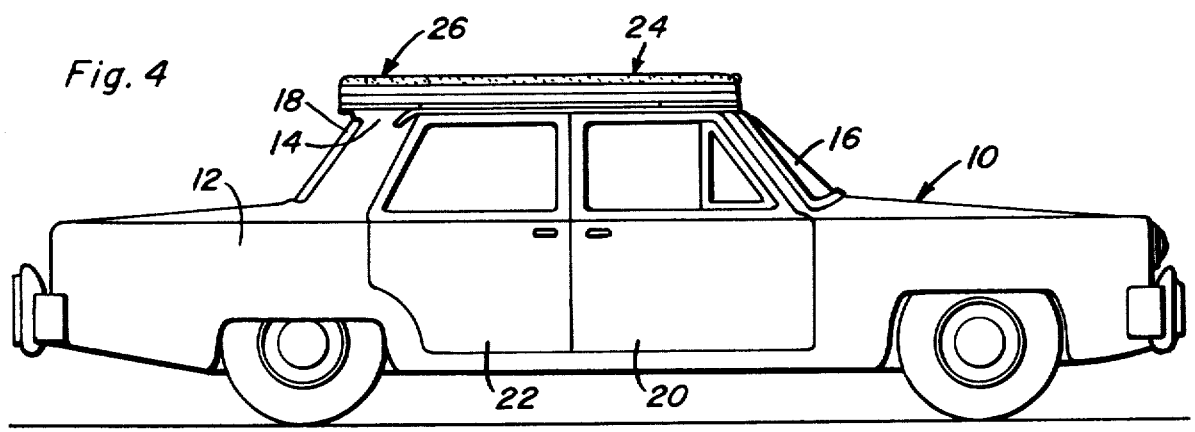
FIG. 4 is a side elevational view of the assemblage illustrated in FIG. 3.

From a comparison of FIGS. 1 and 3 of the drawings, it may be seen how the extension panel members 42, 46 and 48 may be shifted between the retracted positions thereof illustrated in FIG. 3 of the drawings and the extended positions thereof illustrated in FIG. 1 of the drawings. Still further, the opposite ends of the side extension panel members 46 have extension sections 50 pivotally secured thereto as at 52 and which may be swung between retracted positions overlying the opposite ends of the corresponding extension panel members 46 and extended positions extended outwardly of the opposite ends of the corresponding extension panel members 46. Of course, when the extension sections 50 are in their retracted positions, they may be retracted into the corresponding slots into which the extension panel members 46 may be retracted.

The forward marginal edge portion of the upper ply section 28 has an elongated radiant heat absorbing member 54 supported therefrom with a major portion of the heat absorbing member 54 exposed so as to be capable of absorbing radiant heat from the sun. The radiant heat absorbing member 54 may be black in color and have a dull finish so as to readily absorb radiant heat from the sun and may be further constructed of a heat absorbing metal.

The outer marginal edges of the extension panel member 42 includes longitudinally extending upwardly projecting parallel ribs 56 defining a notch 58 therebetween and the corresponding plastic panel members in which the associated slots are formed define downwardly projecting lengthwise extending ribs 60 which may be snapped into the grooves 58 for retaining the extension panel members 42 in retracted position. Of course, the remaining extension panel members 46 and 48 are also provided with ribs and grooves corresponding to the ribs 56 and 58 and the associated marginal portions of the shield which receive the extension panel members 46 and 48 in their retracted positions include ribs corresponding to the ribs 60 whereby the extension panel members 48 and 46 may also be retained in their retracted positions. It is pointed out that the extension panel members 42, 46 and 48 are received within slots defined between relatively thin layers of plastic sheet material and thus these layers may be spread slightly apart so as to enable the gripping of the outer marginal portions of the extension panel members 42, 46 and 48 to facilitate their shifting from the retracted position thereof to the extended position thereof.

In operation, the extension panel members 42, 46 and 48 may be extended at any time desired, except that movement of the vehicle 10 at high speeds while the extension panel members 42, 46 and 48 are extended is not recommended. After the extension panel members 46 have been extended, the extension sections 50 may also be extended to the positions thereof illustrated in FIG. 1. Thus, the extension panel members 42, 46 and 48 and the extension sections 50 serve to shade the adjacent lower portions of the upper body portion of the vehicle 10 from the sun and also from direct rain. In addition, if the radiant heat absorbing member 54 is exposed to the sun, it will absorb sufficient heat to raise its temperature to the point whereby convection air currents will be set up moving upwardly passed the radiant heat absorbing member thereby initiating the forward flow of cooling air through each of the tube members 36. In this manner, not only will the roof structure 14 be shielded from direct rays of the sun and rain or snow, but cooling air will be caused to move through the intermediate ply section 32 of the panel structure 26.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A generally horizontal panel structure for disposition over and support from the roof portion of a vehicle as a sun and rain shield therefor, said panel structure including front, rear and opposite side marginal portions adapted to overlie the corresponding marginal portions of the associated vehicle roof, each of said panel structure marginal portions defining an outwardly opening slot extending therealong, each front and rear marginal portion slot being disposed in a horizontal plane vertically spaced relative to the opposite side marginal portion slots, and an extension panel member shiftably disposed in each of said slots and extendible and retractable relative to the corresponding marginal portion, the opposite ends of one pair of opposite extension panel members including exterior sections thereof pivotally secured thereto for horizontal swinging about upstanding axes between retracted positions disposed in substantially full overlapped relation with said opposite ends and extended positions projecting endwise outwardly of said opposite ends; said horizontal panel structure includes at least three stacked plies, the center ply of said three plies including a plurality of open ended side by side tubes sandwiched between the upper and lower plies; and wherein the front marginal edge of said upper ply includes an elongated radiant heat absorbing member extending therealong which causes cooling by creating convection air currents through said tubes from the opposite ends of said tubes towards the heat absorbing member, said tubes extending between the front and rear marginal edges of said panel structure and having their forward ends disposed closely below said heat absorbing member.

2. The combination of claim 1 wherein said upper ply comprises a layer of heat insulative material.

3. The combination of claim 1 wherein said panel structure includes an additional ply disposed between said upper ply and said tubes and constructed of heat reflective material.

* * * * *